(12) United States Patent
Meatto et al.

(10) Patent No.: US 6,461,455 B1
(45) Date of Patent: Oct. 8, 2002

(54) METHOD OF PRODUCING A HYBRID LEAF SPRING

(75) Inventors: Frank Meatto, Ridgeway, CO (US); Edward Pilpel, Avon, CT (US); D. Michael Gordon, Montrose, CO (US); David C. Gordon, Jr., Vista, CA (US)

(73) Assignee: Pacific Coast Composites, Montrose, CO (US)

( * ) Notice: Subject to any disclaimer, the term of this patent is extended or adjusted under 35 U.S.C. 154(b) by 0 days.

(21) Appl. No.: 09/490,308

(22) Filed: Jan. 24, 2000

(51) Int. Cl.$^7$ ............................................. B32B 31/00
(52) U.S. Cl. .................. 156/64; 156/273.7; 156/273.9; 156/274.8; 156/275.5; 156/275.7; 156/307.7; 156/359; 156/280; 267/47
(58) Field of Search ............................ 156/64, 272.2, 156/272.4, 273.7, 273.9, 274.2, 274.4, 274.8, 275.5, 275.7, 281, 285, 307.1, 307.7, 358, 359, 280; 267/36.1, 47

(56) References Cited

U.S. PATENT DOCUMENTS

| | | | |
|---|---|---|---|
| 1,922,781 A | | 8/1933 | Rogers et al. |
| 2,175,231 A | * | 10/1939 | Thompson .................. 267/47 |
| 2,188,689 A | | 1/1940 | Marco |
| 2,667,347 A | | 1/1954 | Jacobs |
| 2,698,750 A | | 1/1955 | Nicosia et al. |
| 2,861,798 A | | 11/1958 | Lenet et al. |
| 2,969,230 A | | 1/1961 | Scheublein, Jr. et al. |
| 3,204,944 A | | 9/1965 | Brownyer |
| 3,586,307 A | | 6/1971 | Brownyer |

(List continued on next page.)

FOREIGN PATENT DOCUMENTS

| | | |
|---|---|---|
| DE | 3236330 | 5/1983 |
| EP | 0 162 191 | 2/1985 |
| FR | 2 601 905 | 1/1988 |
| GB | 2 125 514 | 3/1984 |
| JP | 53-127958 | 11/1978 |
| JP | 54-022048 | 2/1979 |
| JP | 54-025986 | 2/1979 |
| JP | 54-074057 | 6/1979 |
| JP | 54-074058 | 6/1979 |
| JP | 54-079343 | 6/1979 |
| JP | 54-141852 | 11/1979 |
| JP | 54-141944 | 11/1979 |
| JP | 55-027522 | 2/1980 |
| JP | 55-036644 | 3/1980 |
| JP | 55-86934 | 7/1980 |
| JP | 55-086934 | 7/1980 |
| JP | 55-086935 | 7/1980 |
| JP | 55-087606 | 7/1980 |
| JP | 55-107138 | 8/1980 |
| JP | 56-094041 | 7/1981 |
| JP | 56-120835 | 9/1981 |
| JP | 57-043035 | 3/1982 |
| JP | 57-043036 | 3/1982 |
| JP | 57-101140 | 6/1982 |
| JP | 59-089843 | 5/1984 |
| JP | 60-220233 | 11/1985 |
| JP | 62-20926 | 1/1987 |

*Primary Examiner*—Mark A. Osele
(74) *Attorney, Agent, or Firm*—McCormick, Paulding & Huber LLP

(57) ABSTRACT

In a method for making a hybrid leaf spring at least one layer of composite material is provided and a metal primary leaf. The layer of composite material and metal primary leaf are positioned adjacent one another in a mold having an interior cavity defined by at least one cavity wall. A layer of adhesive material is located between and in engagement with the layer of composite material and the metal primary leaf. The adhesive is cured by controllably heating the metal primary leaf so that energy in the form of heat is conducted therefrom into the adhesive layer bonding said metal primary leaf and layer of composite material together.

23 Claims, 4 Drawing Sheets

U.S. PATENT DOCUMENTS

| | | |
|---|---|---|
| 3,698,702 A | 10/1972 | Beck |
| 3,960,069 A * | 6/1976 | Bowyer .................. 156/359 X |
| 4,126,759 A * | 11/1978 | Brooks .................... 156/94 X |
| 4,411,159 A * | 10/1983 | Spear et al. .................. 73/768 |
| 4,507,907 A * | 4/1985 | Wolfson ...................... 53/478 |
| 4,508,325 A | 4/1985 | Marsh |
| 4,519,591 A | 5/1985 | Bush et al. |
| 4,541,891 A * | 9/1985 | Leatherman ............. 156/379.6 |
| 4,557,500 A | 12/1985 | Collard et al. |
| 4,565,356 A | 1/1986 | Nickel |
| 4,575,057 A | 3/1986 | Robertson |
| 4,683,016 A * | 7/1987 | Dutt et al. .................... 156/69 |
| 4,688,778 A * | 8/1987 | Woltron ...................... 267/148 |
| 4,747,898 A * | 5/1988 | Woltron ............... 156/307.7 X |
| 5,087,503 A | 2/1992 | Meatto |
| 5,225,008 A | 7/1993 | Koyama et al. |
| 5,258,082 A | 11/1993 | Koyama et al. |
| 6,012,709 A * | 1/2000 | Meatto et al. ............. 267/36.1 |

\* cited by examiner

METHOD OF PRODUCING A HYBRID LEAF SPRING

FIELD OF THE INVENTION

The present invention relates generally to vehicle suspension systems that employ leaf springs, and more particularly to leaf springs incorporating layers of composite material and methods for fabricating said springs.

BACKGROUND OF THE INVENTION

Known leaf springs are constructed from several elongated strips or leaves of metal stacked one-on-top-of-the-other and clamped together in a substantially parallel relationship. Typically, these springs are employed in vehicle suspension systems in one of two different load carrying configurations, cantilevered, or three-point-bending; the latter being the more common method of use. A cantilevered leaf spring is one where the leaf spring is fixed or supported at one end to the frame of a vehicle and coupled to an axle at its other end. Alternatively, a leaf spring mounted in three-point-bending, is supported or fixed at one end to the vehicle with the other end supported in a manner that allows for relative movement of the spring. A load is carried by the spring between the two ends. The use of leaf springs mounted in three point bending is so widespread that the Society of Automotive Engineers (SAE) has developed a formal leaf spring design and use procedure.

Metal leaf springs constructed in the manner described above are incorporated into a variety of different vehicle suspensions including, automobiles, light to heavy trucks, trailers, construction equipment, locomotives, and railroad cars. They are also employed in recreational vehicles, such as bicycles, snowmobiles, and ATV's (all terrain vehicles). The leaf springs improve the quality or smoothness of the vehicle's ride by absorbing and storing energy for later release in response to bending and/or impact loads imposed on the vehicle resulting from such things as encountering obstructions in a road during the vehicle's operation.

The mechanical properties defining a vehicle suspension system, particularly the spring rate and static deflection of the leaf springs, directly influence the smoothness of the vehicle's ride. Generally, a smooth ride requires the leaf springs to have large static deflections. The smoothness of the ride is also influenced by the vibration damping characteristics of the leaf springs. Damping is a parameter that quantifies the ability of the leaf spring to dissipate vibratory energy. Therefore, a high degree of damping is desirable in leaf springs used in automobiles to minimize the vibratory amplitudes transferred to the passenger area.

The ability to accurately determine the mechanical properties and performance characteristics of a leaf spring is critical to the proper design of vehicle suspension systems. One of the problems resulting from the construction of conventional leaf springs is that the variable lengths of the stack of individual leaves creates a stepped spring construction that only approximates constant stress, the steps tend to create localized areas of high stress known as stress concentrations which detrimentally affect the load carrying capability and useful life of the leaf spring. In addition, the fact that the springs are composed of lengths of metal stacked one-on-top-of-the-other causes them to be quite heavy; this additional weight causes a concomitant reduction in fuel economy.

Moreover, because it is impossible to predict the exact conditions and stresses that a leaf spring will be subjected to, the fatigue life of the spring is generally limited. This problem is further exacerbated by the build-up of foreign material on and between the individual leaves. Not only does this cause corrosion, thereby weakening the leaf spring and making it more susceptible to fatigue failure, but it also affects the stiffness of the leaf spring and hence the smoothness of the ride of the vehicle in which the spring is employed. Generally the magnitude of the contribution made to the strength of a particular leaf spring due to inter-leaf friction is determined empirically. When foreign material gets between the leaves it can dramatically increase, in the case of particulate matter, or decrease, in the case of oil, the friction between the leaves, thereby altering the original mechanical properties of the spring. In addition, the shear conductivity between the leaves, which is a measure of the amount of shear stress transferred from leaf-to-leaf, is typically low in conventional leaf springs because the individual leaves are only clamped at the ends. Therefore, the stress transfer capability along the length of the spring is dependent on the aforementioned interleaf friction.

In many applications, leaf springs are loaded not only by vertical forces but also by horizontal forces and torques in the longitudinal vertical and transverse vertical planes. These forces are typically generated when the brakes on the vehicle incorporating the leaf spring are applied. The aforementioned horizontal forces and torques cause the leaf spring to assume an "S" shaped configuration, a phenomena referred to as "S-ing" or wrap-up. The stresses induced in the spring when this occurs can be quite high. In order to minimize S-ing in a leaf spring, the stiffness of the spring must be increased; however, this can detrimentally affect the smoothness of a vehicle's ride.

In order to address the above-described problems, those skilled in the art have attempted to fabricate purely composite leaf springs, wherein the individual leaves are formed from a composite material of the type consisting of a plurality of fibers embedded in a polymeric matrix. However, while these springs offered significant reductions in weight, as well as increased fatigue life and damping, their cost was prohibitive. In addition, these composite springs are difficult to fabricate and attach to the frame of a vehicle and required the use of special adapters. A hybrid leaf spring having a metal primary leaf with one or more layers of composite material bonded thereto has been proposed in U.S. patent application Ser. No. 08/906,747 to Meatto, Pilpel, Gordon and Gordon entitled "Hybrid Leaf Spring And Suspension System For Supporting An Axle On A Vehicle", filed on Aug. 6, 1997, the disclosure of which is incorporated herein by reference. The metal primary leaf also defined the means, for example, an aperture extending through each end of the leaf, to mount the spring to the vehicle.

Composite components usually comprise multiple individual layers of material juxtaposed, one on top of the other with adhesive material located between successive layers of the composite, thereby forming a laminate. As used herein, the term "composite material" should be construed to mean a fiber or particle reinforced polymeric material. To bond the layers of composite material together, the adhesive must be cured unless a thermoplastic adhesive is used which requires only melting and fusing. Curing is usually accomplished by heating the composite layers under pressure in a mold to a known curing temperature and then maintaining that temperature for a predetermined period of time.

A difficulty often encountered with producing laminated composite components in this manner is that the individual layers of composite material act as insulators. Therefore, to completely cure a multiple layer laminated composite part, long heating periods are required to allow the adhesive between the inner-most layers to reach curing temperature. This results in decreased productivity, increased energy consumption, wear on the mold, and higher overall cost. These problems are further exacerbated with respect to the above-described hybrid leaf spring because the metal primary leaf acts as a heat sink, drawing thermal energy away from the adhesive material.

Based on the foregoing, it is the general object of the present invention to provide a leaf spring and a method for fabricating the spring that overcomes the difficulties and drawbacks of prior art leaf springs.

It is a more specific object of the present invention to provide a method for producing a hybrid leaf spring wherein adhesive cure times between successive layers of composite material as well as between the metal primary leaf and any adjacent layers of composite material are minimized.

SUMMARY OF THE PRESENT INVENTION

The present invention is directed to a method for making a hybrid leaf spring wherein at least one layer of composite material, and at least one metal primary leaf are laminated together. To facilitate the lamination process, the layer of composite material and the primary leaf are positioned adjacent to one another in an interior cavity defined by a mold. A layer of adhesive is located between and in engagement with the layer of composite material and the metal primary leaf.

Heating means are coupled to the metal primary leaf and are actuated via command signals generated by a controller having temperature profile data stored therein. During operation, the heating means imparts thermal energy to the metal primary leaf which in turn is transferred to, and cures the adhesive material.

Preferably, the heating means is of the resistance type with the metal primary leaf forming part of the heating circuit. In general, a voltage source is provided that includes at least two electrodes attached thereto. Each electrode is also releasably attached to an end of the metal primary leaf, thereby completing the circuit. The primary leaf defines an inherent resistance such that when the voltage source is actuated, the current flowing through the primary leaf, between the electrodes, causes the temperature of the primary leaf to increase. This thermal energy is then transferred from the primary leaf into the layer of adhesive material. The current is varied in response to command signals issued from the controller in order to create the appropriate temperature profile to allow the adhesive material to cure. While a resistance-type heating means has been described, the present invention is not limited in this regard as other types of heating means, such as, but not limited to an induction heater, or a convection-type heater can be substituted without departing from the broader aspects of the present invention.

In the preferred embodiment of the present invention, the above-described mold is constructed of a material referred to by those skilled in the art to which the invention pertains as "tooling board". This material is typically formed from epoxy or polyurethane with fillers, such as ceramics. The tooling board has low electrical conductivity, thereby reducing the potential for arcing that could result from the resistance-type heating described above. While a mold made from tooling board has been described, the present invention is not limited in this regard as other materials, such as, but not limited to metal, may be substituted without departing from the broader aspects of the present invention. Where the mold is metallic, heating means, such as cartridge heaters, or passages for hot oil can be incorporated into the mold to supply additional thermal energy to the hybrid leaf spring during curing of the adhesive.

In an embodiment of the present invention, the above-described at least one layer of composite material includes a plurality of layers of composite material. Each layer is positioned in the mold adjacent to, and approximately aligned with, the next successive layer of composite material with at least one of the layers being adjacent to the metal primary leaf. A layer of adhesive, curable in the above-described manner, is positioned between successive layers of the composite material, as well as between the metal primary leaf and any adjacent layers of composite material. The adhesive is then cured via a combination of heat and pressure.

Alternatively, a layer of elastomeric material is interposed between the composite layers, as well as between the metal primary leaf and any adjacent layers of composite material. A layer of adhesive is spread between the elastomeric material and the composite layers, as well as between the metal primary leaf and any adjacent layers of composite material. In order to prepare the metal primary leaf, the elastomeric material, and the layers of composite material to accept the adhesive, a surface preparation step is usually required. For the metal primary leaf, surface preparation can be accomplished via sandblasting, vapor blasting, or chemical etching, with sandblasting providing the added benefit of slag removal from the metal. Regarding the composite layers, surface preparation is usually achieved via sanding or diamond grinding. The elastomeric layers can be surface treated by, inter alia, etching or embossing. Thermoset type elastomers can also be sanded or ground, while thermoplastic material can be flame treated, corona discharge treated and inert plasma treated. In some instances, the above-described treatments can be combined with sanding and grinding.

Depending on the end use of the hybrid leaf spring made in accordance with the present method, it may be necessary to coat all or part of the spring with a protective coating to increase impact resistance. Alternatively, it may be necessary to coat only those areas where an adhesive layer is exposed to the outside environment.

In one embodiment of the hybrid leaf spring fabricated in accordance with the method of the present invention, pre-cured composite layers are employed with one face of each layer being machined or ground to provide the desired contour of the finished spring. When the machined layers of composite material are placed in the mold, the machined or ground face becomes the bonding surface and is positioned adjacent to the metal primary leaf with a layer of adhesive therebetween. The precured composite layers, and the metal primary leaf can be assembled inside, or outside of the mold with a pin locating the components relative to one another. The pin can also be employed to aid in positioning the uncured spring to the mold.

DETAILED DESCRIPTION OF THE PREFERRED EMBODIMENTS

Figure 1:
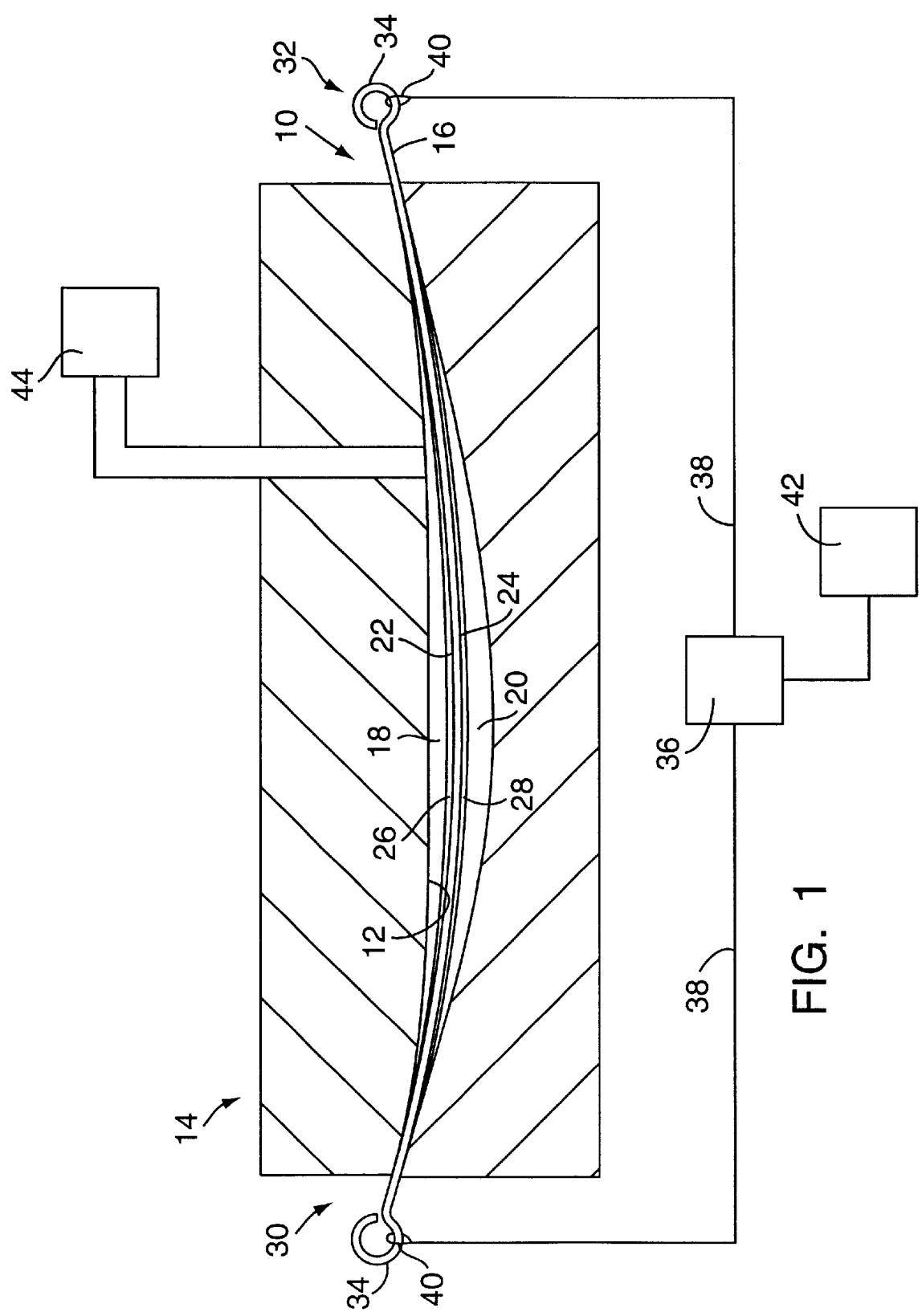
FIG. 1 is a partly schematic side elevational view of an embodiment of the hybrid leaf spring made in accordance with the method of the present invention, showing the metal primary leaf and layers of composite material positioned in a mold with a voltage source coupled to the primary leaf, thereby completing a circuit that causes the primary leaf to act as a resistance-type heater in response to an applied voltage.

As shown in FIG. 1, a hybrid leaf spring generally designated by the reference number 10 is positioned in a cavity 12 defined by a mold 14. The hybrid leaf spring 10 includes a primary leaf 16 with first and second layers of composite material, 18 and 20 respectively, located adjacent to a respective one of a first and second bonding surface, 22 and 24 respectively, defined by the primary leaf 16. A first layer of adhesive material 26 is interposed between the first layer of composite material 18 and the first bonding surface 22 and a second layer of adhesive material 28 is interposed between the second layer of composite material 20 and the second bonding surface 24.

In the illustrated embodiment, the metal primary leaf 16 includes opposed end sections 30 and 32, each defining a loop or eye 34. A voltage source 36 is in electrical communication with the primary leaf 16 via a pair of leads 38 extending therefrom, each having an end 40 coupled to one of the eyes 34. The voltage source 36 is also in communication with a controller 42, for generating command signals in accordance with temperature data stored therein. During operation, the voltage source 36 is energized in response to commands issued from the controller 42 causing a voltage to be induced across the metal primary leaf 16, which due to its inherent resistance, experiences an increase in temperature.

The operation of the controller 42 can be either via "open loop" control or "closed loop" control. In open loop control, a predetermined voltage input is employed to bring the spring to a known temperature. Conversely, in closed loop control, a sensor (not shown) monitors the temperature of the spring and provides signals receivable by the controller 42 that in turn adjusts the voltage supplied by the voltage source 36.

The temperature of the primary leaf 16 increases in response to commands issued from the controller to a degree sufficient to cure the first and second layers of adhesive, 26 and 28 respectively. The cured adhesive material acts to bond the first and second layers of composite material, 18 and 20 respectively, to the primary leaf 16. The interior cavity 12 of the mold 14 can also be pressurized via pump 44 which is in gaseous communication with the mold, thereby ensuring that the layers of composite material, and the metal primary leaf are properly positioned relative to one another as the adhesive cures. While a hybrid leaf spring having a first and second layer of composite material bonded to a primary leaf has been shown and described, the present invention is not limited in this regard as a single, or multiple layers of composite material can also be employed without departing from the broader aspects of the present invention.

Figure 2:
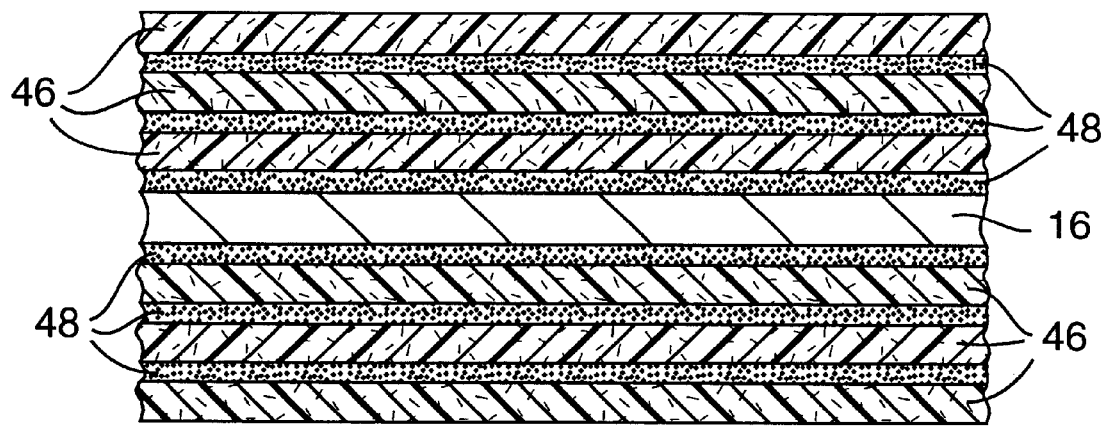
FIG. 2 is a partial, cross-sectional view of the hybrid leaf spring made in accordance with the method of the present invention, showing a spring employing multiple layers of composite material.

As shown in FIG. 2, where multiple layers 46 of composite material are incorporated into the hybrid spring, a layer of adhesive material 48 must be interposed between successive layers of the composite material, as well as between the primary leaf 16 and the next adjacent layer of composite material. The layers of adhesive are cured in the above-described manner, however, increased curing times must be provided for in order to allow all of the adhesive material to reach curing temperature.

Figure 3:
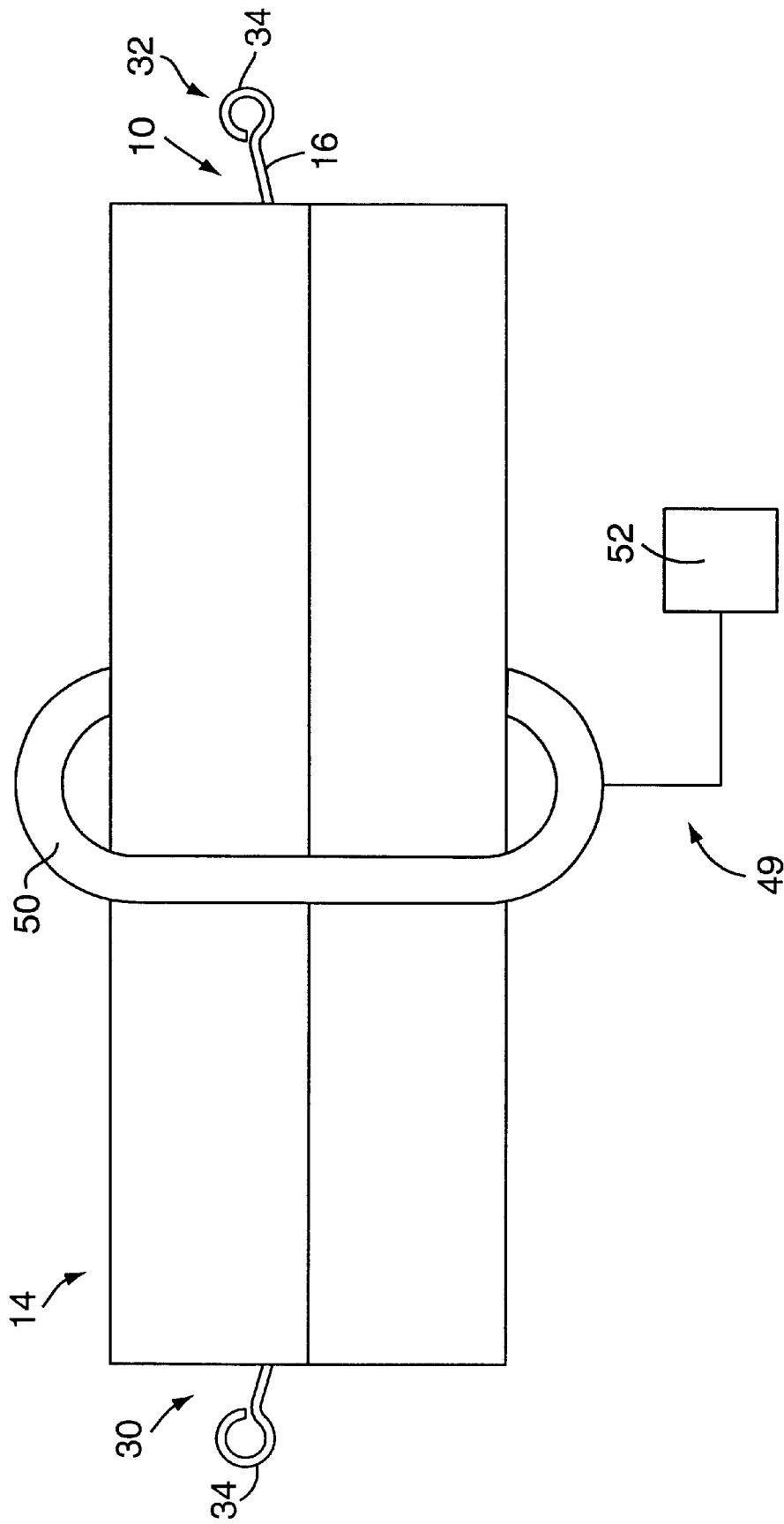
FIG. 3 is a partly schematic, side elevational view of an embodiment of the hybrid leaf spring made in accordance with the method of the present invention showing the metal primary leaf and layers of composite material positioned in a mold and surrounded in part by an induction-type heater.

Methods other than resistance heating can be employed to heat the layers of adhesive material to curing temperature and maintain an appropriate temperature profile. As schematically illustrated in FIG. 3, an induction-type heater generally designated by the reference number 49 can be employed to provide thermal energy to the metal primary leaf 16. In operation, the hybrid leaf spring 10, positioned in the mold with the layers of adhesive material in the uncured condition, is surrounded by a coil 50. An alternating current source 52 is in electrical communication with the coil, providing current to the coil 50. The current in turn generates an alternating magnetic flux around the hybrid spring 10. The current in the coil induces a current in the main leaf 16 which causes an increase in thermal energy. During operation, the temperature of the primary leaf 16 is allowed to increase to the curing temperature of the adhesive, and is held at such temperature until such time as the adhesive material is cured.

Figure 4:
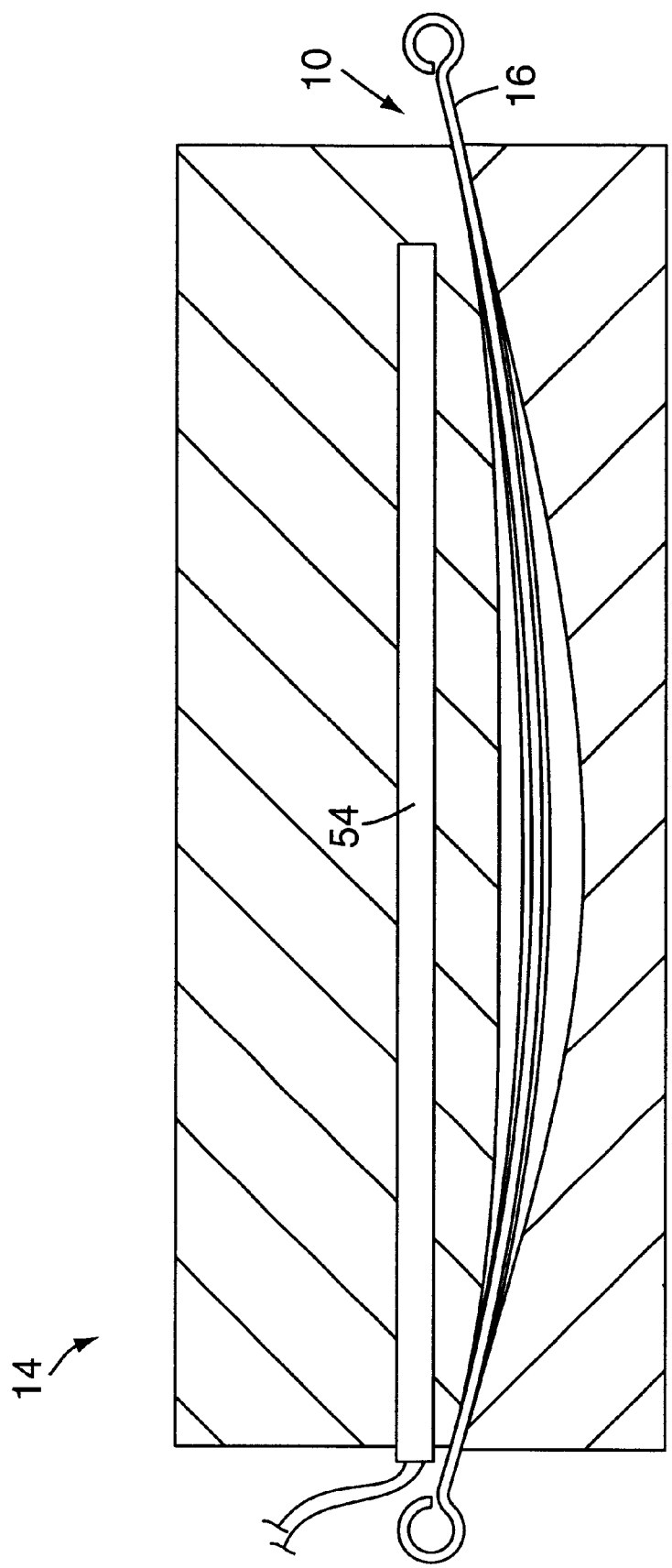
FIG. 4 is a partly schematic, side elevational view of the hybrid leaf spring made in accordance with the method of the present invention showing a mold heated via cartridge-type heaters.

As shown in FIG. 4, the mold 14 can be made from metal and heated via cartridge heaters 54 positioned in bores extending at least partway through the mold. Heating the mold 14 via the cartridge heaters along with simultaneously employing one of the above-described methods for heating the metal primary leaf 16 allows for attaining the adhesive cure temperature more rapidly than if only the primary leaf is heated. While cartridge heaters have been shown and described, the present invention is not limited in this regard as other methods of heating the mold known to those skilled in the pertinent art to which the invention pertains can be employed without departing from the broader aspects of the present invention. For example, hot oil can be pumped through passages defined by the mold, imparting thermal energy thereto. In addition, while the mold material has been described hereinabove as being metal, the present invention is not limited in this regard, as the mold can be fabricated from other suitable materials known to those skilled in the art to which the invention pertains, such as, but not limited to composites, ceramics, or ceramic filled composites without departing from the broader aspects of the present invention.

Referring back to FIGS. 1 and 2, the layers of composite material can assume different configurations. For example, the layers can be precured and then machined to adapt to the desired contour of a finished hybrid spring, or prepreg, or wet layers can be laid up in the mold adjacent to one another, as well as to the primary leaf 16. In each of these configurations, layers of adhesive positioned and cured in the above-described manner are employed.

Figure 5:
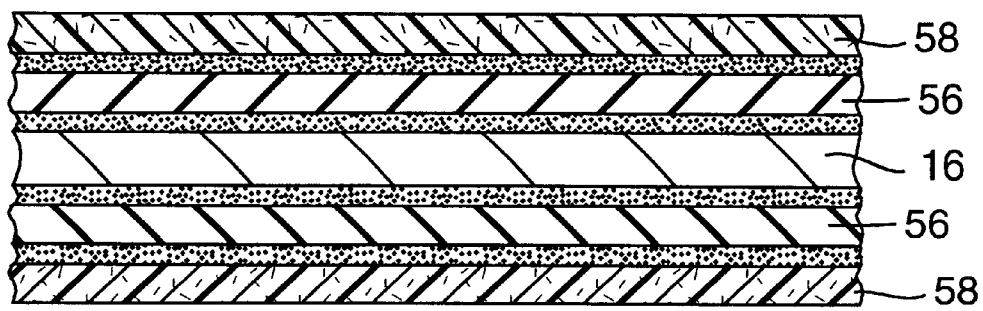
FIG. 5 is a partial cross-sectional view of the hybrid leaf spring of FIG. 2 showing layers of elastomeric material between layers of composite material, and the primary leaf.

As shown in FIG. 5, layers of elastomeric material 56 can be interposed between successive layers of composite material 58, as well as between the primary leaf 16 and any adjacent layers of composite material to provide enhanced damping characteristics to the hybrid spring. The layers of elastomeric material 56 are bonded to the layers of composite material and the metal primary leaf 16 by layers of adhesive material. Prior to assembly in the mold, the surfaces of the hybrid leaf spring components which contact the adhesive material, hereinafter referred to as bonding surfaces, are treated or prepared to make them more receptive to the adhesive. Regarding the metal primary leaf 16, surface preparation can be accomplished via sandblasting, vapor blasting, or chemical etching, with sandblasting providing the added benefit of slag removal from the metal. Regarding the composite layers, surface preparation is usually achieved via sanding or diamond grinding. The elastomeric layers can be surface treated by, inter alia, etching or embossing. Thermoset type elastomers can also be sanded or ground, while thermoplastic material can be flame treated, corona discharge treated, inert plasma treated, and in some instances these treatments can be combined with sanding and grinding.

Depending on the end use of the hybrid leaf spring made in accordance with the present method, it may be necessary to coat all or part of the spring with a protective coating to increase impact resistance. Alternatively, it may be necessary to coat only those areas where an adhesive layer is exposed to the outside environment.

While preferred embodiments have been shown and described, various modifications and substitutions may be made without departing from the spirit and scope of the invention. Accordingly, it is to be understood that the present invention has been described by way of example and not by limitation.

What is claimed is:

1. A method for making a hybrid leaf spring comprising the steps of:
   providing at least one layer of composite material;
   providing a metal primary leaf;
   providing a mold having an interior cavity defined by at least one cavity wall;
   positioning said layer of composite material and said metal primary leaf adjacent to one another in said mold cavity;
   providing a layer of adhesive material between, and in engagement with, said layer of composite material and said metal primary leaf; and
   curing said adhesive material by controllably heating said metal primary leaf so that energy in the form of heat is conducted therefrom into said adhesive layer, thereby bonding said metal primary leaf and said layer of composite material together.

2. A method for making a hybrid leaf spring as defined by claim 1 further including the steps of:
   providing means for pressurizing said mold interior cavity;
   providing means for heating said cavity wall;
   providing a controller having mold pressure, temperature, and time cycle data stored therein; and wherein
   said step of curing said adhesive material includes operating said pressurizing means and said means for heating in response to command signals generated from said controller, thereby pressurizing and heating said interior cavity to cause heat to conduct from said cavity wall, through said layer of composite material, to said adhesive material.

3. A method for making a hybrid leaf spring as defined by claim 1, wherein:
   curing said adhesive material by controllably heating said metal primary leaf includes a voltage source releasably coupled to said primary leaf, thereby forming a circuit with said primary leaf acting as a resistor.

4. A method for making a hybrid leaf spring as defined by claim 3, wherein:
   said primary leaf includes opposed end portions;
   said voltage source includes a pair of conductors, each having an end coupled to said voltage source; and wherein said method comprises the further step of releasably attaching one of said conductors to said primary leaf adjacent to one of said end portions, and releasably attaching the other of said conductors to the other of said end portions.

5. A method for making a hybrid leaf spring as defined by claim 1, wherein:
   said step of providing at least one layer of composite material includes providing a plurality of layers of composite material;
   said step of positioning said layer of composite material and said metal primary leaf adjacent to one another in said mold cavity includes positioning said plurality of layers of composite material adjacent to and approximately aligned with one another with at least one of said layers of composite material being located proximate to, and approximately aligned with said metal primary leaf;
   said step of providing a layer of adhesive material between, and in engagement with, said layer of composite material and said metal primary leaf also includes providing a layer of adhesive material between successive layers of composite material; and wherein said step of curing said adhesive material includes curing said layers of adhesive material located between successive layers of composite material.

6. A method for making a hybrid leaf spring as defined by claim 5, further comprising the steps of:
   providing a plurality of layers of elastic material;
   said step of positioning said plurality of layers of composite material adjacent to and approximately aligned with one another, includes positioning one of said layers of elastomeric material between said metal primary leaf and a first layer of said plurality of layers of composite material; and positioning a layer of elastomeric material between successive layers of said plurality of layers of composite material; and
   said step of providing a layer of adhesive material includes providing a layer of adhesive material between said metal primary leaf and said first layer of elastomeric material, and between said plurality of layers of said elastomeric material and said plurality of layers of composite material.

7. A method for making a hybrid leaf spring as defined by claim 1, wherein:
   said metal primary leaf defines a tension surface and an opposing compression surface; and
   said step of positioning said at least one layer of composite material and said metal primary leaf adjacent to one another in said mold cavity includes positioning said at least one layer of composite material adjacent to said tension surface.

8. A method for making a hybrid leaf spring as defined by claim 1, wherein said metal primary leaf is heated by an induction heater.

9. A method for making a hybrid leaf spring as defined by claim 1, wherein subsequent to said step of curing said adhesive, said method comprises the further step of:
   coating said hybrid leaf spring with a protective coating to enhance environmental resistance.

10. A method for making a hybrid leaf spring as defined by claim 1, wherein subsequent to said step of curing said adhesive, said method comprises the further step of:

coating portions of said hybrid leaf spring wherein said layer of adhesive material is exposed to the outside environment, with a protective coating to enhance environmental resistance.

11. A method for making a hybrid leaf spring as defined by claim 1, further comprising the steps of:

providing at least one layer of elastic material;

said step of positioning said layer of composite material and said metal primary leaf adjacent to one another in said mold cavity further includes locating said at least one layer of elastomeric material between said metal primary leaf and said layer of composite material; and said step of providing a layer of adhesive material includes, providing a layer of adhesive material between said metal primary leaf and said layer of elastomeric material and between said layer of elastomeric material and said layer of composite material.

12. A method for making a hybrid leaf spring as defined by claim 11 wherein:

said at least one layer of elastic material defines opposed bonding surfaces; and said method comprises the further step of preparing said bonding surfaces to receive said adhesive material.

13. A method for making a hybrid leaf spring as defined by claim 12 wherein said step of preparing said bonding surfaces to receive said adhesive material includes etching.

14. A method for making a hybrid leaf spring as defined by claim 12 wherein said step of preparing said bonding surfaces to receive said adhesive material includes embossing.

15. A method for making a hybrid leaf spring as defined by claim 1 wherein:

said primary metal leaf defines at least one first bonding surface;

said at least one layer of composite material defines at least one second bonding surface; and prior to said step of positioning said layer of composite material and said metal primary leaf adjacent to one another in said mold cavity, said method comprises the further steps of preparing said first bonding surface to receive said adhesive material; and preparing said second bonding surface to receive said adhesive material.

16. A method for making a hybrid leaf spring as defined by claim 15 wherein said step of preparing said first bonding surface to receive said adhesive material includes sandblasting.

17. A method for making a hybrid leaf spring as defined by claim 15 wherein said step of preparing said first bonding surface to receive said adhesive material includes vapor blasting.

18. A method for making a hybrid leaf spring as defined by claim 15 wherein said step of preparing said first bonding surface to receive said adhesive material includes chemical etching.

19. A method for making a hybrid leaf spring as defined by claim 15 wherein said step of preparing said second bonding surface to receive said adhesive material includes sanding said second bonding surface.

20. A method for making a hybrid leaf spring as defined by claim 15 wherein said step of preparing said second bonding surface to receive said adhesive material includes grinding said second bonding surface.

21. A method for making a hybrid leaf spring as defined by claim 15, wherein said steps of preparing said first bonding surface and second bonding surface include grinding said bonding surfaces.

22. A method for making a hybrid leaf spring as defined by claim 15, wherein said steps of preparing said first bonding surface and second bonding surface include shot peening said bonding surfaces.

23. A method for making a hybrid leaf spring as defined by claim 1, further comprising the steps of:

providing at least one layer of elastomeric material;

laminating said layer of elastomeric material to said layer of composite material; and wherein instead of said step of positioning said layer of composite material and said metal primary leaf adjacent to one another in said mold cavity, said method includes positioning said layer of composite material having said layer of elastomeric material laminated thereon adjacent to said metal primary leaf.

* * * * *